United States Patent
Houman et al.

[11] Patent Number: 5,618,449
[45] Date of Patent: Apr. 8, 1997

[54] COMPACT PORTABLE HAND-HELD EDM TOOL

[75] Inventors: Leif J. Houman, Oyster Bay, N.Y.; A. Clifford Losee, 3346 Murray Rd., Finksburg, Md. 21048

[73] Assignee: A. Clifford Losee, Finksburg, Md.

[21] Appl. No.: 412,762

[22] Filed: Mar. 29, 1995

[51] Int. Cl.⁶ .................................................. B23H 1/00
[52] U.S. Cl. ................................. 219/69.11; 219/69.14; 219/69.16
[58] Field of Search ................... 219/69.14, 69.15, 219/69.2, 69.11, 69.17, 69.16, 69.13; 210/120; 408/187

[56] References Cited

U.S. PATENT DOCUMENTS

| | | | |
|---|---|---|---|
| 25,542 | 3/1864 | Webb . | |
| 2,385,665 | 9/1945 | Warwick | 219/15 |
| 2,441,319 | 5/1948 | Harding | 219/15 |
| 2,462,438 | 2/1949 | Thomas | 172/126 |
| 2,495,038 | 1/1950 | Tucker | 219/15 |
| 2,592,894 | 4/1952 | Harding | 219/15 |
| 2,753,429 | 7/1956 | McKechnie | 219/15 |
| 2,978,569 | 4/1961 | Boretti et al. | 219/69.17 |
| 2,996,638 | 8/1961 | Webb . | |
| 3,247,599 | 4/1966 | O'Connor . | |
| 3,657,507 | 4/1972 | McNeece | 219/69.16 |
| 3,848,108 | 11/1974 | Takarada | 219/69.16 |
| 3,939,321 | 2/1976 | Bertrand et al. | 219/69.14 |
| 4,259,562 | 3/1981 | Cammann et al. | 219/68 |
| 4,439,659 | 3/1984 | Shimizu | 219/69.2 |
| 4,450,337 | 5/1984 | Inoue | 219/69.17 |
| 4,538,043 | 8/1985 | Alexander | 219/69.2 |
| 4,628,171 | 12/1986 | Colby et al. | 219/69.16 |
| 4,638,141 | 1/1987 | Houman et al. | 219/69.11 |
| 4,705,932 | 11/1987 | Aso et al. | 219/69.2 |
| 4,948,933 | 8/1990 | Thompson | 219/69.2 |
| 5,002,546 | 3/1991 | Romano | 408/187 |
| 5,019,683 | 5/1991 | Abdukarimov et al. | 219/69.2 |
| 5,217,605 | 6/1993 | Kottke | 210/120 |
| 5,410,118 | 4/1995 | Boccardoro | 219/69.16 |

*Primary Examiner*—Geoffrey S. Evans
*Attorney, Agent, or Firm*—Leonard Bloom

[57] ABSTRACT

A hand-held compact and portable EDM tool can be carried by an operator to a remote site and used for fast drilling holes and removing taps, drills etc. in just minutes. High pressure water flushes away debris, cools and protects the workpiece. Sophisticated electronic circuitry continually monitors the gap between the electrode and the workpiece, controls speed and direction of movement of the electrode and breaks shortings which may occur in the gap. The EDM tool can be operated without involvement of the operator. A magnetic holder removably secures a frame to the workpiece.

9 Claims, 11 Drawing Sheets

COMPACT PORTABLE HAND-HELD EDM TOOL

FIELD OF THE INVENTION

The present invention relates to an electrical discharge machining ("EDM") apparatus, and more particularly, to a compact portable hand-held EDM tool of less than 20" height which can be carried by a worker to a remote job site for drilling holes in an electro-conductive workpiece.

BACKGROUND OF THE INVENTION

In EDM, a working electrode is juxtaposed with an electro-conductive workpiece across a machining gap (which may be filled with a machining liquid) and a pulsating DC or AC voltage is continuously applied to the machining gap to produce successive electrical discharges across the machining gap in order to remove material from the workpiece.

Massive stationary machine tools have employed EDM for the cutting of holes or cavities in metal workpieces (and, in particular, intricate designs) for many years, and step-wise improvements in the technology have been made from time to time.

For instance, U.S. Pat. No. 3,848,108 discloses an improved servo system for advancing or feeding the electrode in an EDM apparatus which possesses increased sensitivity and stability. U.S. Pat. No. 4,439,659 discloses an electrode servo-feed system having a quick-response electrode retraction and reciprocation. U.S. Pat. No. 4,450,337 discloses an EDM method and apparatus and claims the features of fine machined quality, stable machining performance, and a removal rate and a low wear of the tool electrode, wherein a continuous voltage (without pulsing) provides a succession of stock removal discharges. U.S. Pat. No. 4,638,141 discloses a modular EDM system which can be easily assembled to perform a given job and then can be taken apart and rearranged for the next job.

Basically, the existing EDM machine tools have a number of advantages, as follows: (1) not limited by the hardness of the workpiece, as long as this workpiece is electro-conductive; (2) accuracy and a high degree of stability of a hole-drilling process; (3) no part distortion since no vibration is applied to the workpiece; (4) no heat distortion owing to liquid cooling.

However, these existing EDM machine tools are bulky and somewhat massive, expensive, and cannot be brought to a remote job site. The latter is a major disadvantage and requires that the workpiece be brought to a shop where the EDM machine is installed. Since the workpieces sometimes encountered are heavy and cumbersome, such as construction equipment, it is impractical to bring such workpieces to the EDM equipment. This is particularly the case when the hole is to be drilled in a broken tap, bolt, drill, etc. embedded in a large piece of equipment or other workpiece.

Accordingly, it would be desirable to provide a portable, compact, relatively lightweight and easily handled EDM tool which could be brought to the remote job site to drill a hole or holes in a broken bolt (for example) in order to disintegrate the bolt and remove it from the equipment, such as a bulldozer.

Besides, most stationary EDM tools are slow, too precise for certain purposes and very expensive. A portable EDM tool which would be very fast, sufficiently precise for the special purposes intended herein, and relatively inexpensive, would be very desirable.

SUMMARY OF THE INVENTION

It is, therefore, an object of the present invention to provide a relatively inexpensive, compact, portable and held—held electro discharge machining (EDM) tool which can be easily carried by a worker to a remote job site and used for drilling a hole in a workpiece and especially for removing a metallic object in the workpiece.

It is another object of the present invention to provide a compact portable hand-held EDM tool which can be easily carried to the workpiece to be machined, and which can be manipulated by an operator (or automatically without the operator involvement) for fast and sufficiently-precise operations.

It is yet another object of the present invention to provide a compact portable hand-held EDM tool, wherein a gap between the electrode and the workpiece is continually electro-mechanically, automatically monitored and adjusted, and wherein a servo system feeding the electrode to the workpiece is continually electro-mechanically controlled in order to provide optimal conditions for cutting and to break an undesired shorting between the electrode and the workpiece.

It is a further object of the present invention to provide an EDM tool which can be easily secured to the workpiece, and which can be conveniently manipulated regardless of the orientation of the workpiece.

The present invention finds particular utility as a portable hand-held compact tool for drilling openings, holes or cavities. The tool is also intended as a remover of broken taps, bolts or other electro-conductive parts embedded in the workpiece, especially in heavy equipment at remote job sites.

According to the teachings of the present invention, there is herein described a preferred embodiment of a hand-held compact portable EDM tool which may be carried to a remote job site and used for drilling a hole in a metal workpiece. The tool includes a frame provided with a pair of handles for carrying or manipulating the tool. An electrode is carried by the frame and is fed by a suitable AC or DC power supply for generating sparks, thereby vaporizing metal particles of the workpiece. A non-cyclic electronically-controlled servo means on the frame continually monitors the distance between the electrode and the workpiece and the difference of potentials in the gap. An electronic controller is coupled to the servo means and controls movement (speed and direction) of the electrode and, therefore, the speed of metal vaporizing. Another, low voltage, power supply, independent of the first power supply, serves for energizing the motor and the servo controller. The shorting which may occur between the electrode and the workpiece is broken by momentary retraction of the electrode away from the workpiece.

Preferably, the electrode has a longitudinal channel formed therein for supplying a jet of water for cooling the workpiece and flushing out of the workpiece metal particles vaporized from the workpiece. Water is supplied from a reservoir to the electrode and thereafter removed from the workpiece to the reservoir, such that the water is recycled. A filter within the reservoir serves for filtering the recycled water. A tubular water shield surrounds the electrode to avoid splash of water away from the workpiece.

Optionally, a magnetic holder may be removably secured to the frame in order to secure the frame to the workpiece at various orientations of the workpiece, thereby permitting a "no-hands" operation.

The frame comprises a cylindrical housing accommodating the servo means and the electronic controller for the servo means. A hollow stabilizer tube is maintained to the cylindrical housing, and an electrode actuator tube reciprocates within the stabilizer tube.

A proximate end of the electrode actuator has a holding means for securing the electrode to the electrode actuator tube and for allowing a quick change of the electrodes without specialized tools.

A depth stop set screw is secured to a distal end of the electrode actuator tube to stop movement of the electrode actuator tube once a predetermined depth of cut is reached. This is accomplished by engaging of a depth stop switch secured to the top surface of the cylindrical housing.

Viewing in another aspect, the present invention teaches a portable EDM tool including an electrode connected to a first power supply and cooperating with the workpiece to generate a spark gap therebetween, thereby providing an operational mode for the tool and a motor and servo control means for advancing and retracting the electrode relative to the workpiece and adjusting the length of the spark gap during the operational mode of the tool. The tool further includes means for jogging the motor without the first power supply being connected to the electrode, thereby providing a positioning mode for the tool, such that the tool may be positioned relative to the workpiece prior to the operational mode of the tool. A second power supply energizes the motor and the servo control means in the positioning mode.

These and other objects of the present invention will become apparent from a reading of the following specification, taken in conjunction with the enclosed drawings.

DETAILED DESCRIPTION OF THE INVENTION

Referring to FIGS. 1–15, an electrical discharge machining (EDM) tool 10 is a portable compact hand-held tool which can be used in a shop and/or at a remote job site for drilling holes in a metal workpiece 11 or for removing taps, drills, bolts 12, etc. from a piece of equipment.

The EDM tool 10 includes a frame 13 supporting a cylindrical housing 14 (which may be made of aluminum or other suitable material) and having a top surface 15 and a bottom surface 16. A hollow stabilizer tube (or barrel) 17 (which may be made of stainless steel) is carried by the cylindrical housing 14. A hollow electrode actuator tube 18 is movably secured within the cylindrical housing 14, such that its distal end 19 extends beyond the top surface 15, and such that its proximal end 20 extends beyond the bottom surface 16 within the stainless stabilizer tube 17 towards the workpiece 11. The electrode actuator tube 18 is slidably supported within the cylindrical housing 14 (by means discussed below) and is adapted to reciprocally slide within the stabilizer tube 17. On its proximate end 20, the electrode actuator tube 18 removably and adjustably receives and retains the electrode 23 by a conductive collet 27 which is a convenient means for securing the electrode 23 and which provides a quick change of electrodes without any specially-designed tools.

A pair of handles 25 and 26 are removably secured to the cylindrical housing 14 symmetrically to each other relative to its longitudinal axis 22. The handles 25 and 26 serve for conveniently carrying or manipulating the EDM tool 10.

Figure 12:
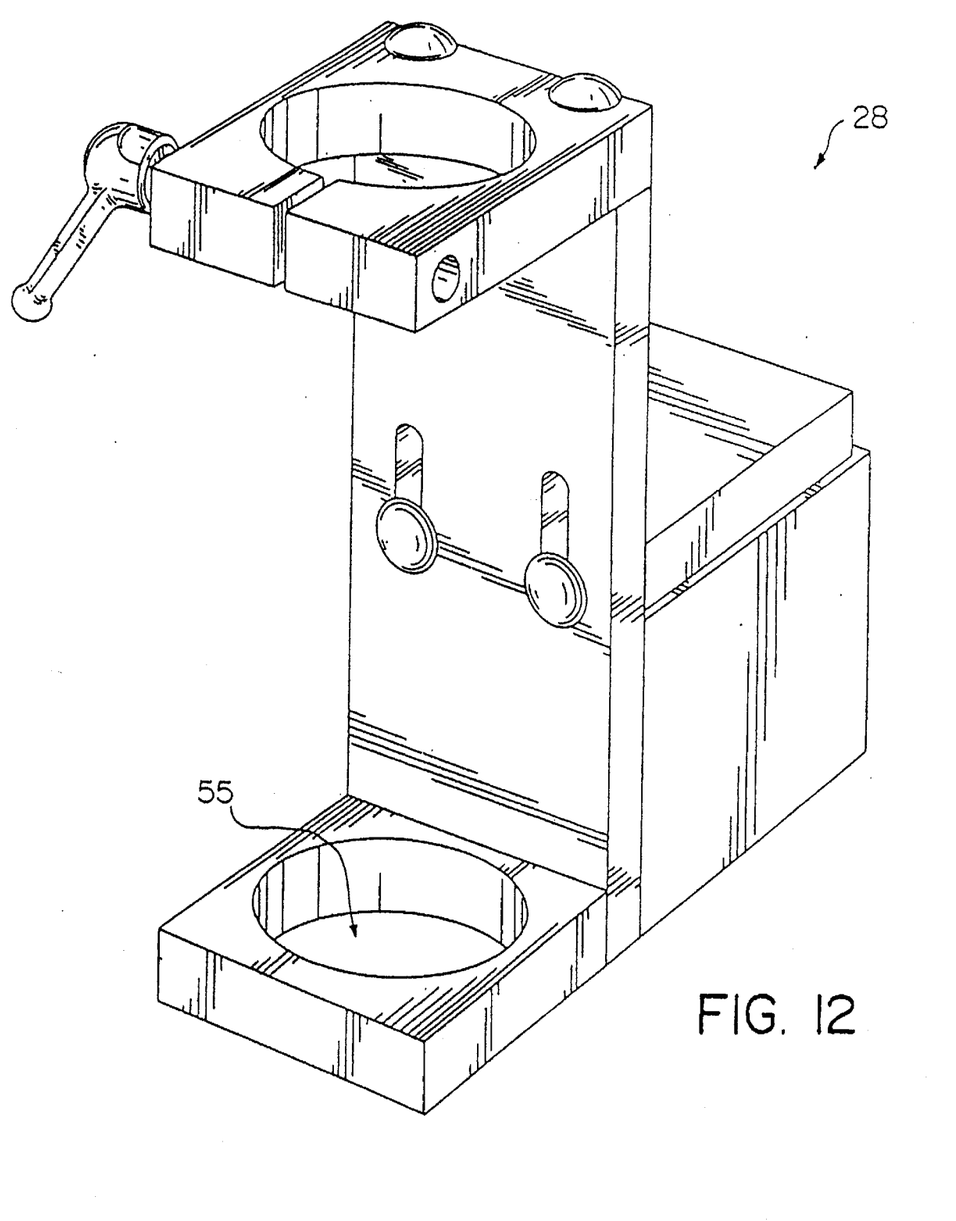
FIG. 12 is a perspective view of a foot/magnetic holder.

The frame 13 may be put either on a standard foot 27 or an optional magnetic foot 28 (as best shown in FIG. 12) which secures the frame 13 to the workpiece 11, and which permits a "no-hands" operation of the EDM tool 10. If the standard foot 27 is used, the EDM tool 10 should be held in position by means of handles 25 and 26. No appreciable operator pressure is required since downward movement of the electrode and its cutting speed are controlled automatically.

Figure 9:
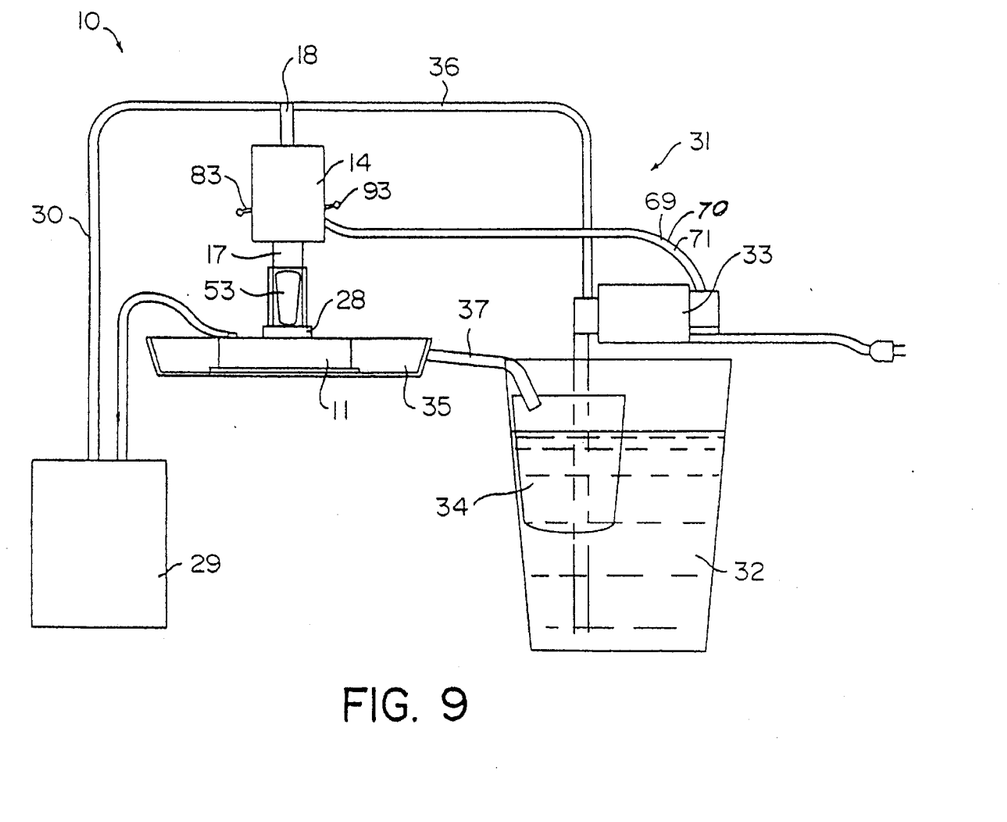
FIG. 9 is a schematic view of the EDM tool including a water supply system and power supply system.
Figure 10:
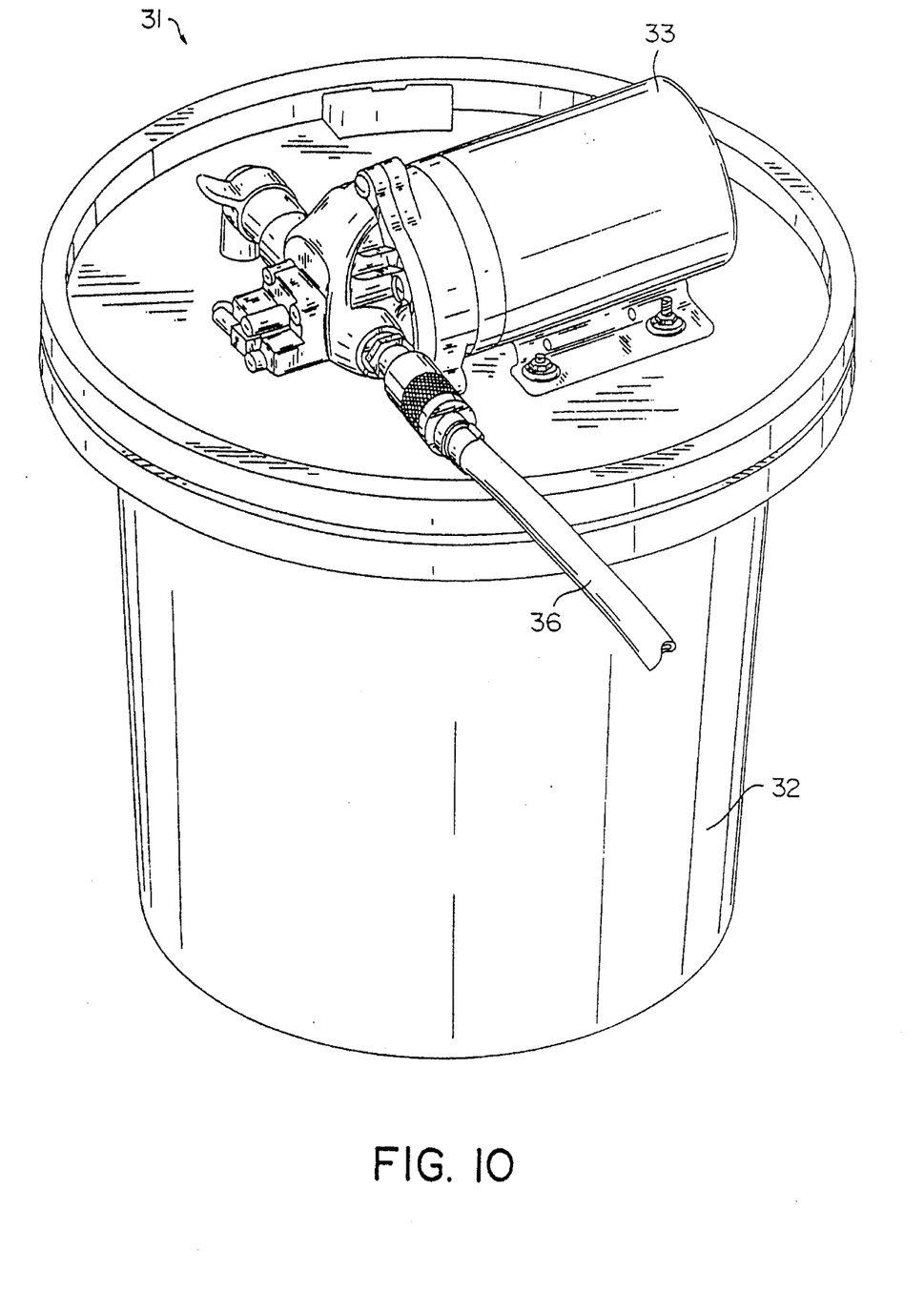
FIG. 10 is a pictorial view of a recycling water supply system of the present invention.
Figure 11:
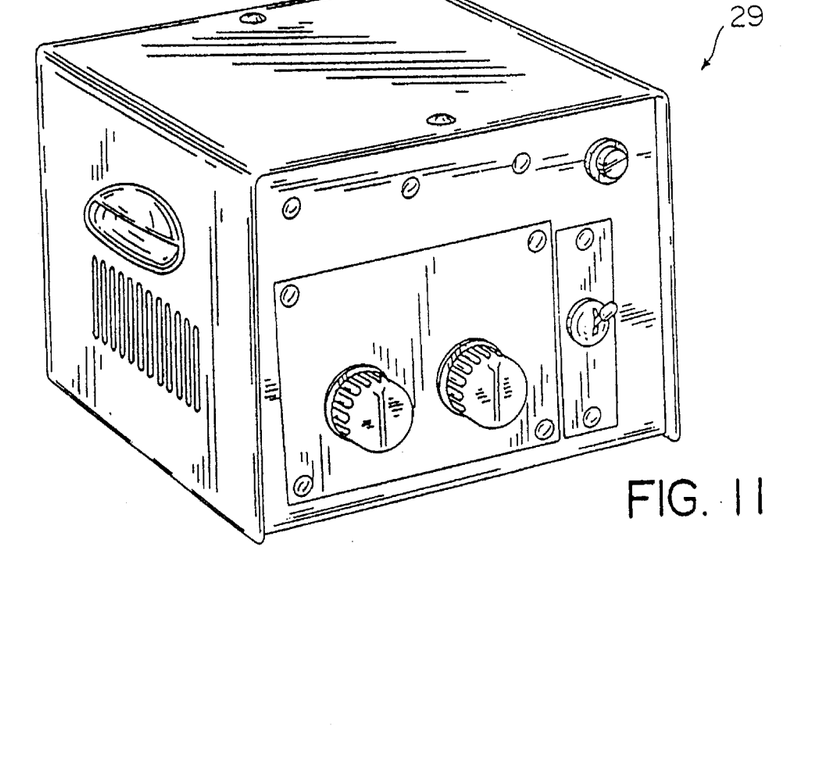
FIG. 11 is a pictorial view of a power supply used in the EDM tool of the present invention.

As best shown in FIGS. 9 and 11, a power supply 29 is provided for the EDM tool 10 to apply a difference of potentials between the electrode 23 and the workpiece 11, such that the electrode 23 will generate sparks in a gap between the electrode 23 and the workpiece 11. The power supply 29 can be almost any AC or DC welder or other suitable power supply, available and convenient to use. Optionally, a dedicated power supply 29 may be provided as a part of the tool 10. A suitable power supply line 30 which is connected to the distal end 19 of the electrode actuator tube 18 is used.

As best shown in FIGS. 1, 2, 9 and 10, the EDM tool 10 includes a recycling water supply system 31 for cooling the workpiece 11 and for flushing out of the workpiece metal particles evaporated therefrom.

Figure 1:
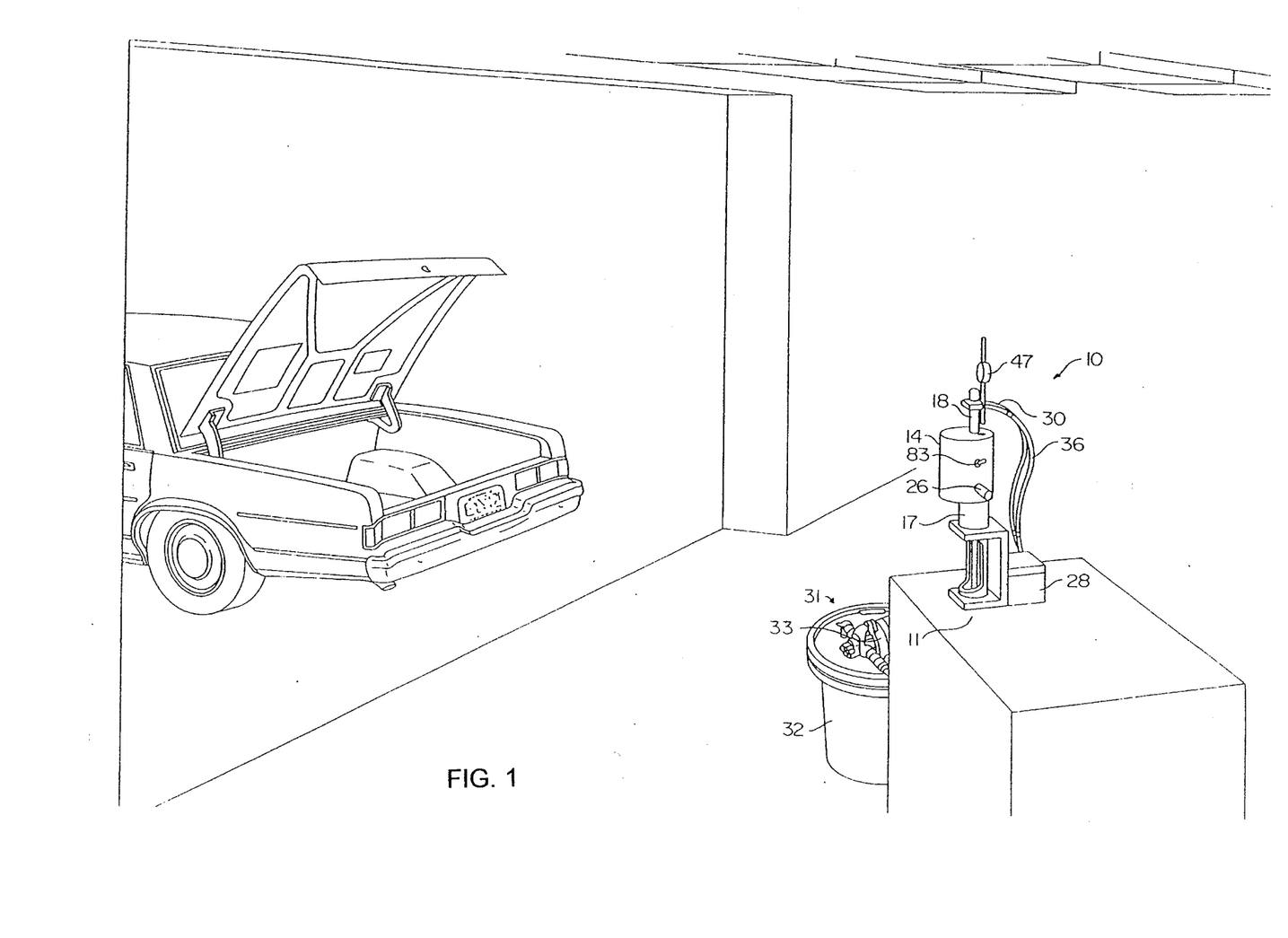
FIG. 1 is a pictorial view of the portable hand-held EDM tool of the present invention taken to a remote job site and secured to a workpiece.
Figure 2:
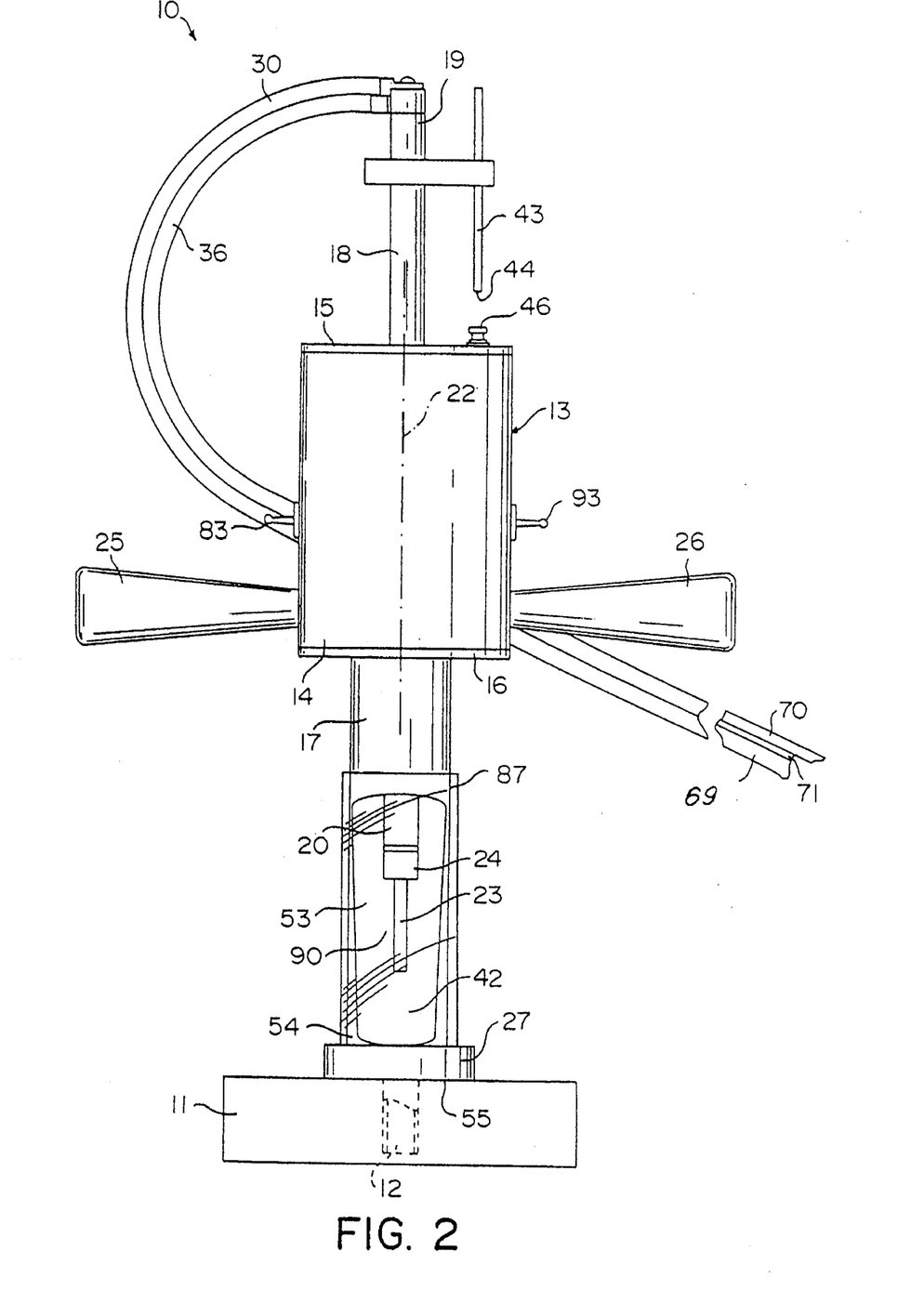
FIG. 2 is a front view of the EDM tool of the present invention.
Figure 3:
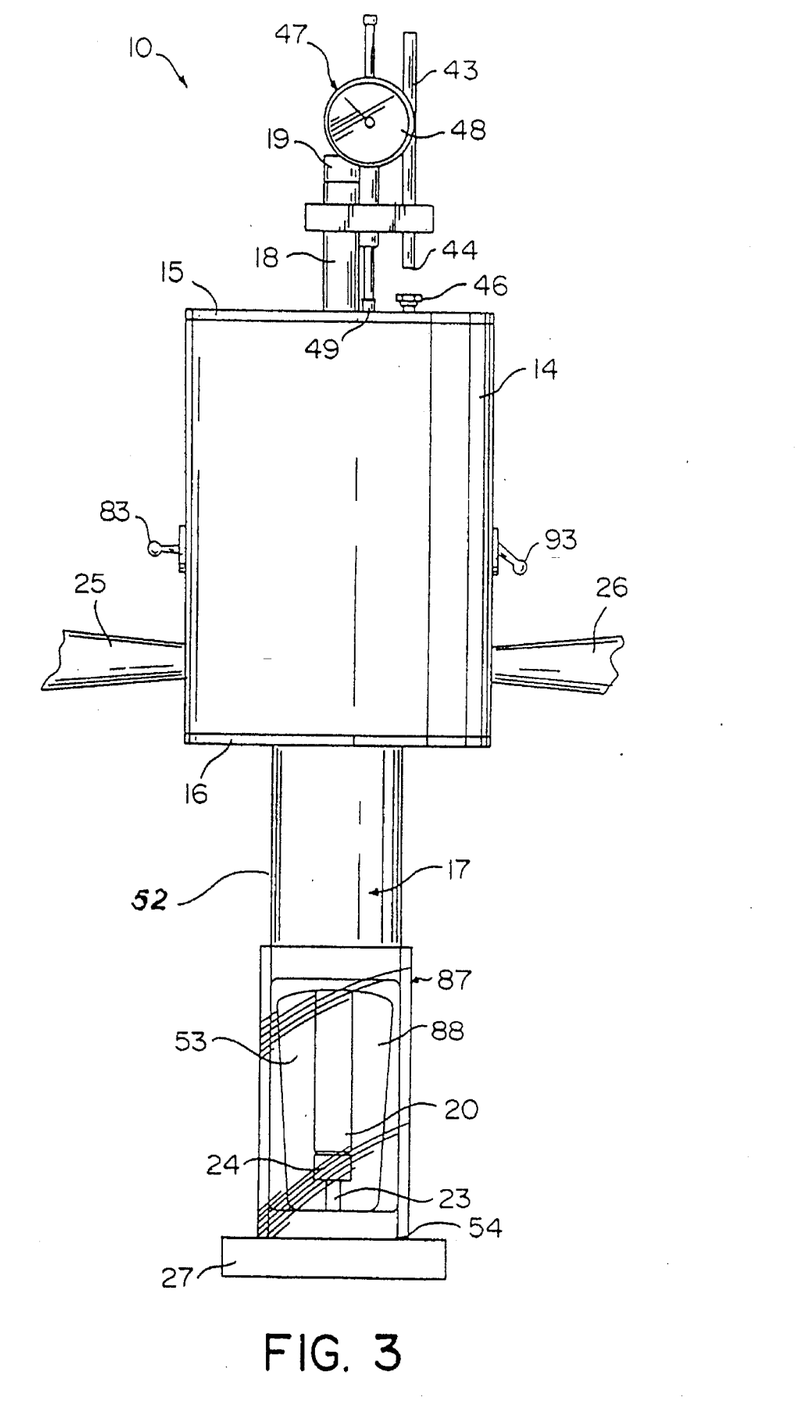
FIG. 3 is a front view of the tool of FIG. 2 using a dial indicator.
Figure 4:
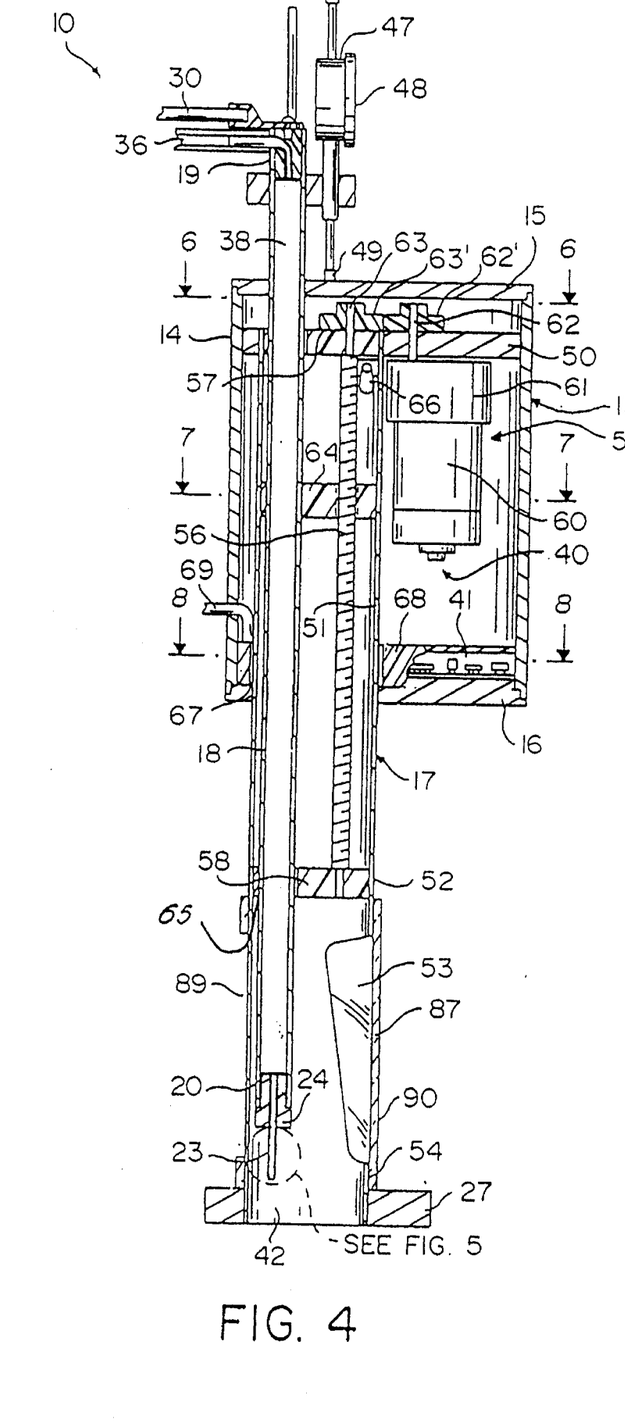
FIG. 4 is a longitudinal cross-sectional view of the EDM tool of FIG. 3.
Figure 5:
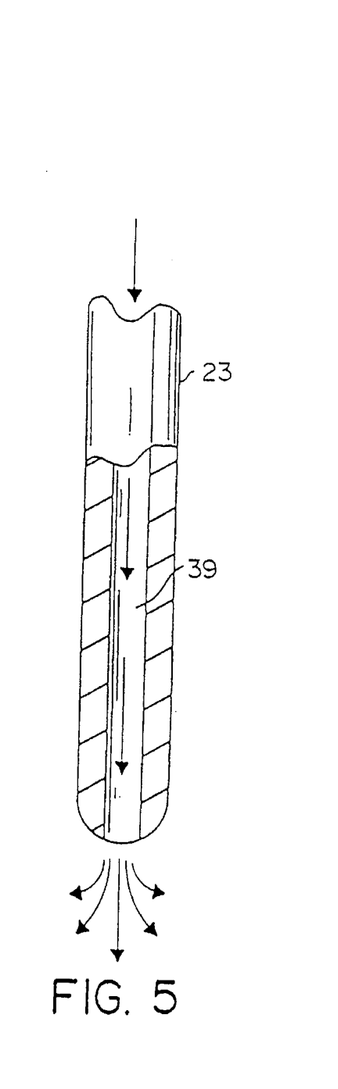
FIG. 5 is a longitudinal cross-section view of the electrode.
Figure 6:
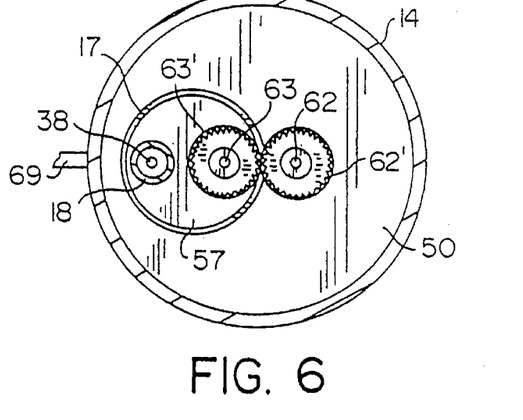
FIG. 6 is a cross-sectional view, taken along the lines 6—6 of FIG. 4, and showing the drive mechanism between the motor and the electrode actuator tube.
Figure 7:
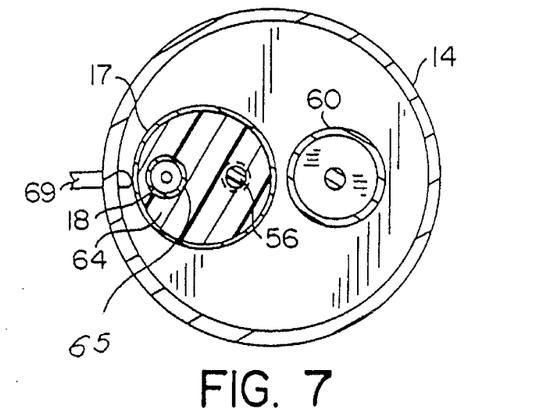
FIG. 7 is a further cross-sectional view, taken along the lines 7—7 of FIG. 4, and showing the mechanism for advancing the electrode actuator tube.
Figure 8:
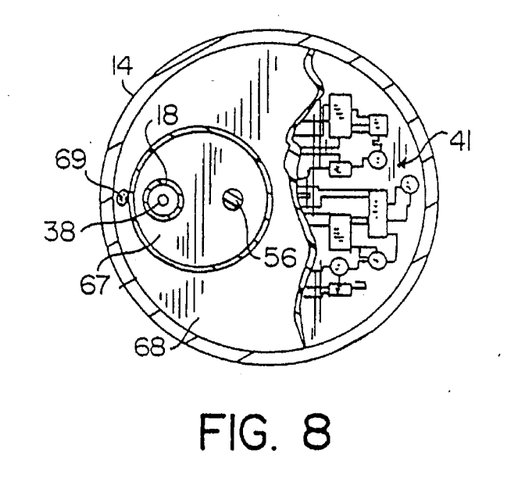
FIG. 8 is still a further cross-sectional view, taken along the lines 8—8 of FIG. 4, and showing the electronic control package in the bottom of the housing.

The water supply system 31 comprises a reservoir 32 containing a predetermined volume of water (for instance, 4 gallons of water), a pump 33 (for instance, a 100 PSI pump), a filter 34 installed within the reservoir 32 for filtering the recycled water, a catch-basin 35, a water supply line 36 and a water drain 37. Water is supplied to the distal end 19 of the electrode actuator tube 18, and is further supplied to the electrode through the electrode actuator tube 18 which has an internal channel 38 (as best shown in FIG. 4). A jet of water is finally supplied to the workpiece through a longitudinal channel 39 of the electrode 23 (as best shown in FIG. 5). The water is removed from the workpiece 11 to the reservoir 32 through the water drain 37 which supplies water to the filter bag of the filter 34. Although a simple water supply (as, for example, a hose from an existing faucet, providing minimal 60 PSI to the EDM tool 10) can be used, the self-contained water supply system 31 uses and recycles its own water, thereby providing total portability of the EDM tool 10. The water supply system 31 shares the 120 V/15 A power source used by the EDM tool 10.

A servo system 40 and an electronic controller 41 coupled to the servo system 40, and which is actually a part of the servo system 40, are accommodated in the cylindrical housing 14 (as best shown in FIG. 4) to continually monitor the distance (gap) 42 between the electrode 23 and the workpiece 11 by controlling the speed of movement of the electrode and the speed of metal vaporizing from the workpiece 11. The servo system 40 and the controller 41 are energized by a power supply 21 independent of the power supply 29. The power from the power supply 21 is supplied to the motor 60, the pump 33 and the electronic systems 40, 41 via a power supply connection 70, pump cable 69 and the line 77 for electronics, respectively, best shown in FIG. 2,4, 6–9, 13 and 15. The electrode 23 moves downwardly until a predetermined depth of cut is achieved or until a shorting occurs. The shorting may be caused between the electrode 23 and the workpiece 11 by debris, etc. from the machining process. The electronic controller 41 breaks the shorting by a momentary retraction of the electrode 23 away from the workpiece 11 and then continues downward movement of the electrode 23 in order to reach the predetermined depth of cut. For this purpose, a depth stop set screw 43 is removably secured to the distal end of the electrode actuator tube 18. A lower end 44 of the depth stop set screw 43 is set on a certain distance from the top surface 15 of the cylindrical housing 19, which corresponds to the needed predetermined depth of cut. A depth stop switch 45, which is an element of the controller 41, has an actuating element (button) 46 on the top surface 15 of the cylindrical housing 14. Once, during the downward movement of the electrode 23, the lower end 44 of the depth stop set screw 43 hits the button 46, the depth stop switch 45 stops the downward movement.

Optionally, a dial indicator 47 (best shown in FIGS. 1, 3 and 4) for measuring the depth of cut is used. The dial indicator 47 comprises a scale 48 for visual indication of the relative position between the electrode 23 and the workpiece 11 and a sensing element 49 resiliently engaging the top surface 15 of the cylindrical housing 14 for monitoring a progress of cut.

As best shown in FIG. 4, the stabilizer tube (or barrel) 17 is secured to the cylindrical housing 14 by an aluminum plate 50. The stabilizer tube 17 has an internal portion 51 and an external portion 52. The external portion 52 extends beyond the bottom surface 16 of the cylindrical housing 14 and includes an opening 53 allowing a visual monitoring of the operation performed and convenient access to the electrode 23. A lower edge 54 of the stabilizer tube 17 engages the workpiece 11 during the operation and surrounds a particular area 55 where a hole is to be drilled.

A lead screw 56 is secured within the stabilizer tube 17 in parallel to its longitudinal axis 22 and is held in place by insulating bearing plates 57 and 58 (as best shown in FIG. 4).

A gear motor 59 (which is a part of the servo system 40) is secured to the bearing plate 57 (by means known to those skilled in the art and shown in FIG. 4) within the cylindrical housing 14 and includes a motor 60 (for instance, a 12 V DC motor) and a gear box 61 with a shaft 62. The shaft 62 (carrying a gear 62') drives a shaft 63 (carrying a gear 63') of the lead screw 56, thereby forcing a clamp (nut) 64 to slide along the lead screw 56 up or down, subject to a direction dictated by the direction of rotation of the gear motor 59. A threaded connection of the clamp 64 and the lead screw 56 is known to those skilled in the art and is not intended to be discussed herein. The clamp 64 has an opening 65 wherein the electrode actuator tube 18 is secured and carries the electrode actuator tube 18 upward or downward, subject to direction and speed of movement determined by the electronic controller 41 which controls the servo system 40 of the tool 10.

An upper limit switch 66 serves to shut off the motor 60 in order to stop the upward movement of the electrode actuator tube 18 before it bumps itself against the top of the stabilizer tube 17. The upper limit switch 66 (best shown in FIG. 4) is located on a bracket (not shown) next to the top of the stabilizer tube 17 and has a switch toggle (not shown) which projects into the stabilizer tube 14 through a hole (not shown), where it can be activated by the upward movement of the clamp (nut) 64 sliding along the lead screw 56 thereby shutting off the motor 60 and stopping the upward movement of the clamp (nut) 64.

The circuitry of the servo system 40, including the electronic controller 41, is located within the cylindrical housing 14 adjacent to the bottom surface 16 (as best shown in FIG. 4). The electronic circuitry 41 is placed on a conductive circular metal disk (also acting as a heatsink) having a shape and a size of a cross-section of the cylindrical housing 14 and also having an opening 67 allowing the stabilizer tube 17 to pass through, and thus constitutes a servo system electronic module 68 which can be installed or replaced conveniently and fast. Being thus packaged, the tool 10 has a very compact design.

Figure 13:
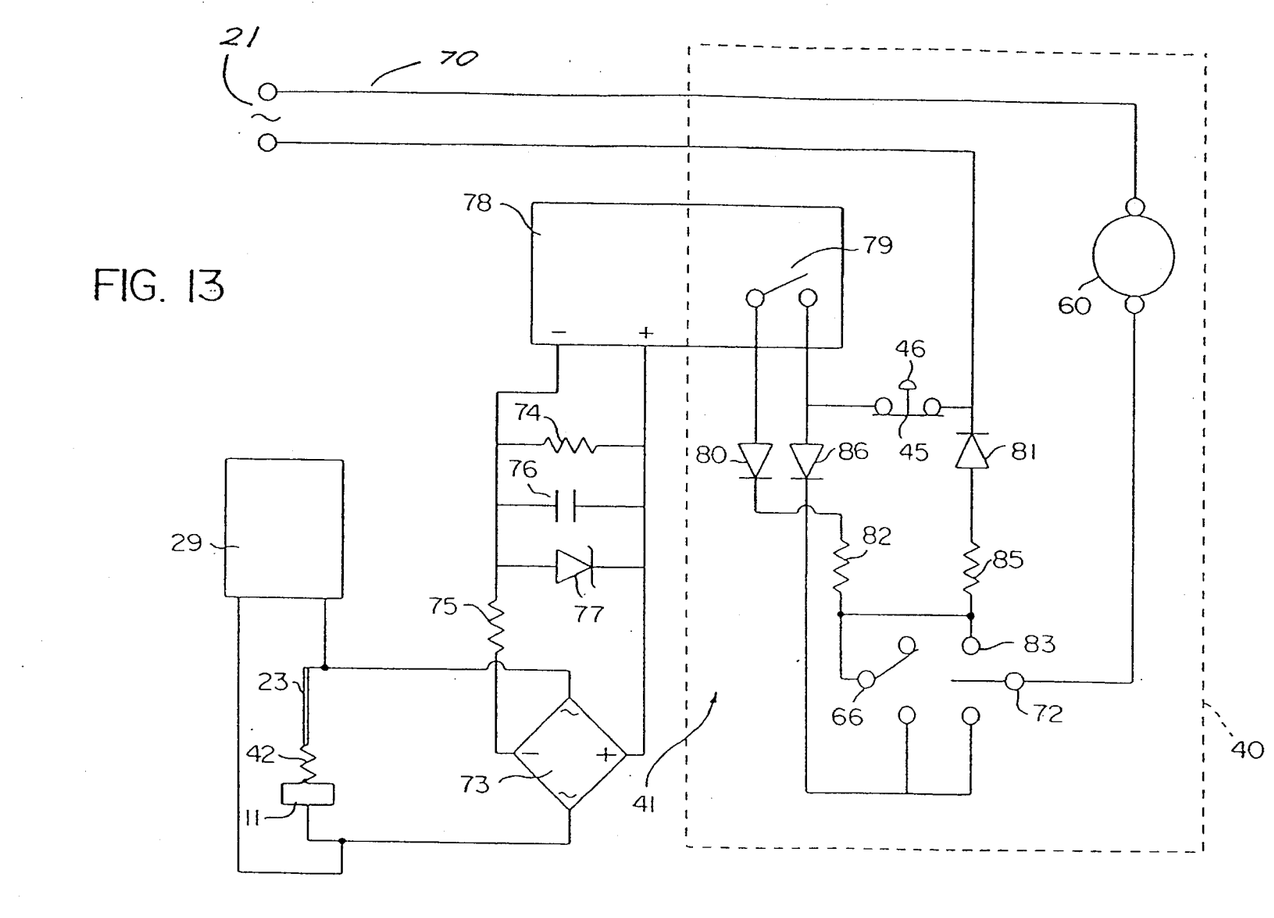
FIG. 13 is a wiring diagram of a servo system (including electronic controller and servo-motor) for the EDM tool of the present invention.
Figure 15:
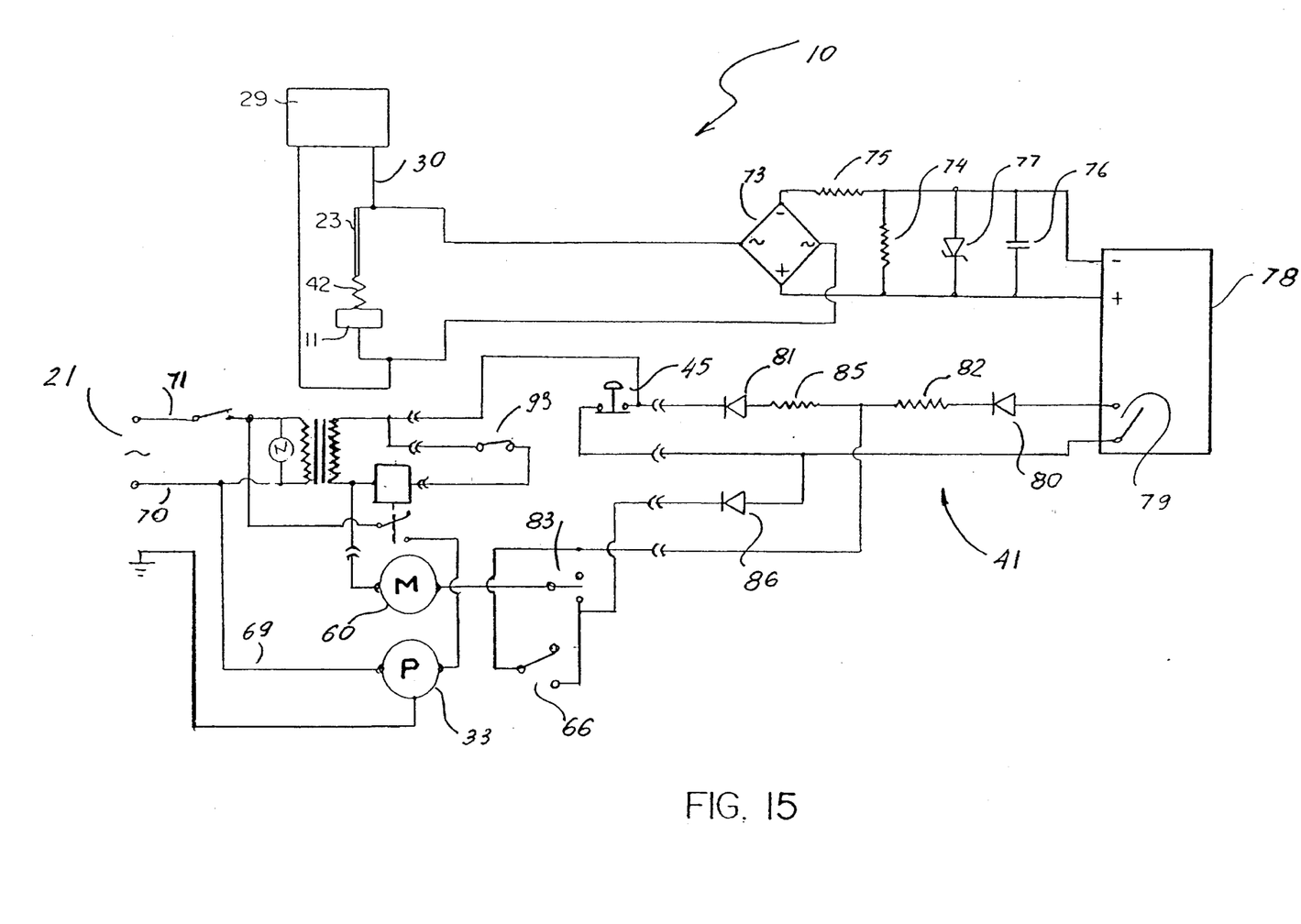
FIG. 15 is a wiring diagram of the EDM tool of the present invention.

As best shown in FIGS. 13 and 15, the servo system 40 of the EDM tool 10 of the present invention is adapted to regulate the spark-discharge gap 42 and includes the reversive servo motor 60 with a single throw switch 72, a gap voltage sensing means 73, the power supplies 21 and 29 (discussed above), and the controlling means 41 connected therebetween. (It will be appreciated by those skilled in the art that the electronic circuit of the servo system 40 is by no means limited for use of this particular application, but can be used any place where a simple circle is needed for servo control (direction control) of a DC motor). The output of the power supply 29 (which may be any convenient arc welder or other suitable power source) is fed to the gap 42, thereby providing a cutting current to remove metal particles from the workpiece 11. A constant flow of a coolant (for instance, water) is maintained through the gap 42 to wash eroded particles as the machining process continues. A bridge rectifier 73 is connected across the gap 42 to allow any AC or DC (+ or −) voltage signal to enter the rectifier 73 and come out at the correct polarity needed to control a solid state relay 78. As the relay 78 is sensitive to DC pulses, a small capacitor 76 (0.5 µF) stabilizes the voltage making the pulses overlap sufficiently for the relay 78 to function without delay. The solid state relay 78 is a commercially available solid state relay with a control voltage ranging from 3 V to 32 V (DC) and a normally opened contact 79 (only AC).

A Zener diode 77 cuts the voltage supplied to the relay 78 to the level acceptable by the relay 78, i.e. clamps the maximum voltage for the relay 78. The voltage signal from the rectifier 73 passes through the resistive voltage divider 74, 75 to the solid-state relays 78, the triggering mode of which can be regulated by changing of ratio between resistors 74 and 75.

The direction of the motor 60's rotation is controlled by the single pole single throw normally opened contact 79 associated with the solid state relay 78 and the principle of the controlling is based on use to two diodes 81 and 86 and one or two power resistors 82 and 85. If the contact 79 is open and AC voltage is applied as best shown in FIGS. 13 and 15, the resulting half wave (of the AC voltage) will force the DC motor 60 to run in one direction depending on the polarity of the diode 81. If the contact 79 is closed, the diode 80 will be activated, and since the diode 81 is in series with the resistor 85, the half-wave of the opposite polarity going through the diode 80 will be dominant and will reverse the direction of the motor 60. By connecting the resistor 82 of different value that the resistor 85 in series with the diode 80, the RPM (rotations per minute) in either direction can be changed.

The EDM tool operates in two modes: a positioning mode, when the electrode 23 is to be positioned above the spot where the cutting is to be started, and an operational mode, when the cutting is performed. In the positioning mode, only the AC low voltage source 21 is needed, and the contact 79 is opened. Positioning of the electrode 23 is controlled by a jog up/down switch 83.

A diode 86 is used strictly during jogging (positioning) by a jog up/down switch 83 when the contact 49 is dormant, such that the electrode 23 may be positioned relative to the workpiece 11 prior to the operational mode of the tool 11.

In the operational mode, the contact 79 is closed and provides a "down" signal, such that the electrode 23 moves down and cuts the metal. Down and up speed of the machining is regulated by changing ratio between resistors 82 and 85. For instance, if the resistor 82 has 5 Ω and the resistor 85 has 20 Ω, a slow down and fast up during machining is provided. As soon as down limit switch 45 (described above) is actuated, the circuit going through the contact 79, is broken and the motor 60 reverses the direction of its rotation, thereby moving the electrode actuator tube 18 up.

In one of the embodiments of the present invention, the resistor 74 has 10 K Ω, the resistor 75 has 10 K Ω, the capacitor 76 has 0.5 μF, the diode 77 is a 20 V Zener diode, the voltage divider 74/75 inputs 3÷32 V DC to the relay 78, the resistors 82 and 85 have 5 Ω and 20 Ω, respectively. It will be appreciated by those skilled in the art, that other values of the elements of the circuitry are possible.

Figure 14:
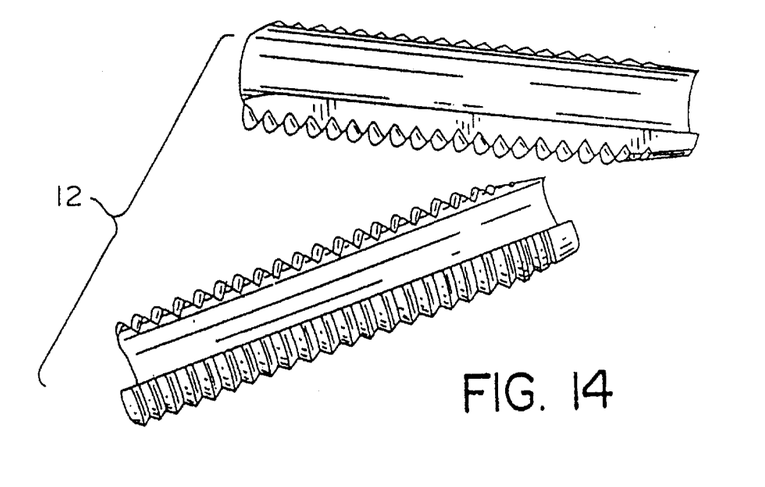
FIG. 14 is a pictorial view of a ⅜" tap cut and removed out of the piece of equipment.

The EDM tool 10 comes with five electrodes 23 of different sizes and shapes in their cross-sections. This allows removing of approximately twenty five kinds of ⅛" to ¾" taps, drills, bolts, etc (a broken ⅜" tap is best shown in FIG. 14). As shown in FIG. 5, each electrode 23 has a longitudinal channel 39 formed therein for supplying a jet of water to the workpiece 11 for cooling the electrode and the workpiece and flushing out the evaporated metal particles away from the workpiece.

The tool 10 is provided with a tubular transparent water shield 87 preventing water supplying to the workpiece 11 of relatively high-pressure (for example, 50–100 PSI) to spray back upon the operator and onto everything located near the workpiece. The water shield 87 comprises a rigid tubular transparent member 88 having an opening 89 and can be releasably secured to the external portion of the stabilizer tube 17. The tubular member 80 is rotated 180° around the longitudinal axis of the stabilizer tube 17, such that during the operation of the tool 10, the opening 53 on the stabilizer tube 17 is overlapped by a section 90 of the tubular member 88 which does not include the opening 89. Besides the visual monitoring of the operation of the tool 10, the opening 53 on the stabilizer tube 17 and the opening 89 on the tubular member 88 of the water shield 87 allow convenient access to the electrode 23 and allow a quick replacement of electrodes when needed or desired.

In order to operate the tool 10, the following steps should be undertaken:

1. Install the correct size electrode 23 in the collet 24 on the proximal end 20 of the electrode actuator tube 18.
2. Set amperage of the power supply 23 corresponding to the electrode 23 installed.
3. Connect the water supply line and the power supply line to the distal end 19 of the electrode actuator tube 18, and all necessary lines.
4. Connect the power supply's "Ground" to the workpiece 11.
5. Position the workpiece 11 in a place allowing for water runoff.
6. Position the tool 10 on the target area 55 on the workpiece 11.
7. Use the JOG up/down switch 83 to position the electrode ⅛" above the spot where the cutting is to be started (switch 83 is also the operate on/off switch if the power supply 29 is "ON").
8. If the optional magnetic foot is used, lock it down.
9. Set the depth stop set screw 43.
10. Turn the water shield 87 into the "closed" position.
11. Turn on the welder or the power supply.
12. Turn on the water supply by a water control switch 93; be sure the water is squirting out of the end of the electrode.
13. Turn on the tool 10 (the electrode will start moving down, when the electrode contacts the metal, there will be a lot of sparks).
14. If the magnetic foot is used, the operator is not needed to manipulate the tool 10 ("no hands" operation); otherwise, the operator has to hold the tool 10 steadily in position by the handles 25 and 26. There is no need to press the handles 25, 26 since downward movement and cutting speed are controlled automatically.
15. The tool 10 will stop moving downward when the depth stop screw hits the stop switch, and the operator must turn the switch 83 off. (The operator can turn the tool 10 off at any time with the switch 83).
16. Turn off the power supply and water supply. Power supply must be "off" for the JOG up/down switch 83 to work.
17. Use the JOG switch 83 to back the electrode out of the hole.

Sometimes, the electrode will back up while running. This is a designed-in feature which allows the electrode to break shorts that can be caused by debris, etc., from the machining process.

The EDM tool 10 of the present invention uses a method of machining metal with highly controlled bursts of electric energy. The unique technology of the present invention puts EDM into a portable, hand held, fast cutting, compact tool 10 designed to drill holes and to blast down through broken taps, drills and bolts, splitting them, so that the remaining pieces can be removed easily. Hardened materials, such as carbide, are easily cut by the tool 10. High pressure water flushes away debris, cools and protects the workpiece. There is neither tool pressure nor vibration to harm the workpiece, nor flammable fluids. Low voltage makes it very safe to use. The time saved and the workpieces saved quickly pay for the tool 10.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A hand-held compact portable EDM tool carried by a worker to a remote job site and used for drilling a hole in a metal workpiece, comprising a frame with handle means for carrying or manipulating the tool, means including an electrode carried by the frame for generating sparks in a gap between the electrode and the workpiece, and non-cyclic electronically-controlled servo means on the frame for continually monitoring and adjusting the distance between he electrode and the workpiece and preventing an undesired shorting therebetween, further including a magnetic holder removably securing the frame to the workpiece at various orientations of the workpiece, thereby permitting no-hands operation.

2. The EDM tool of claim 1, wherein the frame comprises a cylindrical housing accommodating the servo means and the controlling means, the cylindrical housing having a bottom surface and a top surface, wherein a stabilizer tube is maintained to the cylindrical housing, wherein an electrode actuator tube reciprocatively slides within the stabilizer tube, the electrode actuator tube having spaced apart a distal end and a proximate end, the distal end extending beyond the top surface of the cylindrical housing and the proximate end extending beyond the bottom surface of the cylindrical housing towards the workpiece, the stabilizer tube having an internal portion secured within the cylindrical housing and an external portion extending beyond the bottom surface of the cylindrical housing, while the drilling being performed a lower edge of the stabilizer tube engaging the workpiece around an area where the hole being drilled, the stabilizer tube having an opening on the external portion, the proximate end of the electrode actuator having a holding means removably securing the electrode to the electrode actuator tube, wherein the handle means includes a pair of handles removably secured to the cylindrical housing symmetrically relative to a longitudinal axis of the cylindrical housing.

3. The EDM tool of claim 2, further including a tubular water shield removably secured to the external portion of the stabilizer tube and surrounding the electrode to avoid splash of water away from the workpiece through the opening on the stabilizer tube.

4. The EDM tool of claim 2, further including a reversible motor secured within the cylindrical housing outside the stabilizer tube, wherein a lead screw is secured within the stabilizer tube, parallel to a longitudinal axis of the stabilizer tube, wherein the motor is in gearing arrangement with the lead screw, wherein a clamp is slidably secured to the lead screw, wherein the electrode actuator tube is secured within an opening in the clamp, such that when the motor via the gearing arrangement, drives the lead screw to rotate in a predetermined direction and with a predetermined speed, the clamp slides along the lead screw and carries the electrode actuator tube downward or upward, thereby controlling the distance between the electrode carried by the electrode actuator tube and the workpiece, and wherein a controller means determines said predetermined direction and predetermined speed.

5. The EDM tool of claim 4, wherein the controller means includes a bridge rectifier having an AC input and DC output, the AC input being electrically connected to the gap between the electrode and the workpiece, a resistive voltage divider being connected to the DC output and supplying a DC electrical signal corresponding to a voltage in the gap to a solid state relay, which, being triggered in a predetermined mode, control direction and speed of rotation of the reversible motor, and thus control movement of the electrode.

6. The EDM tool of claim 2, further including a set of electrodes, and wherein the holding means on the proximate end of the electrode actuator tube allows quick change of the electrodes without a facilitating tool.

7. The EDM tool of claim 2, further including a depth stop set screw removably secured to the distal end of the electrode actuator tube and in parallel thereto, the depth stop set screw being set at predetermined depth, and a depth stop switch within the cylindrical housing, the depth stop switch having an actuating element secured to the top surface of the cylindrical housing, wherein the depth stop switch is actuated to stop the electrode actuator tube movement towards the workpiece once the depth stop screw engages the actuating element of the depth stop switch.

8. A compact portable EDM tool for drilling a hole in an electro-conductive workpiece, comprising a frame with at least one handle for carrying or manipulating the tool, the frame comprising a housing having an upper surface and a bottom surface, bearing plate being secured within the housing adjacent to the upper surface, a gear motor being cantilevered to the bearing plate, the gear motor having a motor shaft protruded through the bearing plate, a barrel being cantilevered to the bearing plate, a lead screw being secured to the bearing plate in parallel to a longitudinal axis of the barrel, the lead screw having a screw shaft protruded through the bearing plate, the screw shaft being in gearing arrangement with the motor shaft, a clamp nut sliding along the lead screw as the lead screw rotates, the clamp nut having an opening, an electrode actuator tube being secured within the opening in the lamp nut, the electrode actuator tube having a distal end and a proximal end, wherein the distal end of the electrode actuator tube extends beyond the upper surface of the housing, wherein the proximal end of the electrode actuator tube extends within the barrel beyond h bottom surface of the housing, an electrode being removably secured to the proximal end of the electrode actuator tube, an electronic package being secured within the housing adjacent to the bottom surface, the electronic package having a clearance opening for passing the barrel through, the electronic package being in electrical connection with the gear motor and controlling direction and a speed of the gear motor rotation, thereby controlling a direction and a speed of the electrode actuation tube movement, and thereby controlling a distance between the electrode and the workpiece further including a magnetic holder removably securing the frame to the workpiece at various orientations of the workpiece, thereby permitting a non-hands operation.

9. A hand-held compact portable EDM tool carried by a worker to a remote job site and used for drilling a hole in a metal workpiece, comprising:

an electrode generating sparks in a gap between the electrode and the workpiece, a non-cyclic electronically-controlled servo means continually monitoring the distance between the electrode and the workpiece, a controller means coupled to the servo means and controlling movement of the electrode and speed of metal vaporizing, wherein a shorting occurred between the electrode and the workpiece is broken by momentary retraction of the electrode away from the workpiece, a frame comprising a cylindrical housing accommodating the servo means and the controlling means, the cylindrical housing having a bottom surface and a top surface, a pair of handles being removably secured to the cylindrical housing symmetrically relative to a longitudinal axis for carrying or manipulating the tool, wherein a hollow stabilizer tube is maintained to the cylindrical housing, wherein an electrode actuator tube is slidably secured within the stabilizer tube, the electrode actuator tube having spaced apart a distal end and a proximate end, the distal end extending beyond the top surface of the cylindrical housing and the proximate end extending beyond a bottom surface of the cylindrical housing towards the workpiece, the stabilizer tube having an internal portion secured within the cylindrical housing and an external portion extending beyond the bottom surface of the cylindrical housing, a lower edge of the stabilizer tube engaging the workpiece while the drilling being performed and surrounding an area on the workpiece where the hole being drilled, the stabilizer tube having an opening on the external portion, the proximate end of the electrode actuator tube having a holding means removably securing the electrode to the electrode actuator tube, a power supply and a power supply line for applying electric power across the gap between the electrode and the workpiece, the power supply line being connected to the distal end of the electrode actuator tube, a reservoir containing a predetermined volume of water and a water supply line connected to the distal end of the electrode actuator tube for supplying water from the reservoir to the electrode, and water supply coupling removing water from the workpiece to the reservoir, such that the water is recycled, wherein the electrode has a longitudinal channel formed therein for supplying a jet of water for cooling the workpiece and flushing out metal particles evaporated from the workpiece, a filter means within the reservoir for filtering the recycled water, a tubular water shield surrounding the electrode to avoid splash of water away from the workpiece through the opening in the stabilizer tube and removably secured to the external portion of the stabilizer tube, a magnetic holder removably securing the frame to the workpiece at various orientations of the workpiece, thereby permitting no-hands operation, and a depth stop set screw and an indicator measuring depth of cut and checking progress of the cut being removably secured to the distal end of the electrode actuator tube, the depth stop set screw being set at predetermined depth, and a depth stop switch within the cylindrical housing, the depth stop switch having an actuating element secured to the top surface of the cylindrical housing, wherein the depth stop switch is actuated to stop the electrode actuator tube movement towards the workpiece once the depth stop set screw engages the actuating element of the depth stop switch.

* * * * *